US008667083B2

(12) United States Patent
Ghosh et al.

(10) Patent No.: US 8,667,083 B2
(45) Date of Patent: Mar. 4, 2014

(54) SIMPLIFYING PROVISIONING OF ASYNCHRONOUS INTERACTION WITH ENTERPRISE SUITES HAVING SYNCHRONOUS INTEGRATION POINTS

(75) Inventors: Rajesh Ghosh, Nadia (IN); Abhishek Verma, Lucknow (IN)

(73) Assignee: Oracle International Corporation, Redwood Shores, CA (US)

( * ) Notice: Subject to any disclaimer, the term of this patent is extended or adjusted under 35 U.S.C. 154(b) by 320 days.

(21) Appl. No.: 13/249,889

(22) Filed: Sep. 30, 2011

(65) Prior Publication Data

US 2013/0086204 A1 Apr. 4, 2013

(51) Int. Cl.
*G06F 15/16* (2006.01)

(52) U.S. Cl.
USPC .......................................................... 709/217

(58) Field of Classification Search
USPC .......................................................... 709/217
See application file for complete search history.

(56) References Cited

U.S. PATENT DOCUMENTS

| | | | | |
|---|---|---|---|---|
| 7,877,453 | B2 * | 1/2011 | Alexander et al. | 709/207 |
| 7,962,574 | B2 * | 6/2011 | Bauchot et al. | 709/218 |
| 8,214,451 | B2 * | 7/2012 | Grossner et al. | 709/217 |
| 8,250,212 | B2 * | 8/2012 | Felton et al. | 709/226 |
| 8,296,718 | B2 * | 10/2012 | Appleyard et al. | 717/102 |
| 8,468,217 | B2 * | 6/2013 | Appleyard et al. | 709/219 |
| 2003/0079047 | A1 | 4/2003 | Fitts | |
| 2007/0192431 | A1 * | 8/2007 | Liu | 709/217 |
| 2008/0091448 | A1 | 4/2008 | Niheu et al. | |
| 2008/0163166 | A1 | 7/2008 | Raman | |
| 2009/0249296 | A1 | 10/2009 | Haenel | |
| 2010/0125618 | A1 | 5/2010 | Dutta | |
| 2010/0241712 | A1 * | 9/2010 | Nitzsche et al. | 709/206 |
| 2012/0226811 | A1 * | 9/2012 | Parmar et al. | 709/226 |
| 2013/0067035 | A1 * | 3/2013 | Amanat et al. | 709/219 |
| 2013/0159517 | A1 * | 6/2013 | Kumarjiguda et al. | 709/224 |

FOREIGN PATENT DOCUMENTS

WO 2005048066 A2 5/2005

OTHER PUBLICATIONS

"Application Integration on an Enterprise Level", Pervasive Software Inc., downloaded circa: Mar. 31, 2011, pp. 1-3. http://www.pervasiveintegration.com/scenarios/Pages/eai_enterprise_application_integration.aspx.
Juan R. Rodriguez, Alex Barbosa Coqueiro, et al. "Building composite Application", IBM Corporation, First Edition, Published Jul. 2007, pp. 1-35.
"Peoplesoft Enterprise Peopletools", Oracle PeopleSoft Enterprise, Oracle Data Sheet, Copyright 2007, pp. 1-7.

(Continued)

*Primary Examiner* — Brian P Whipple
(74) *Attorney, Agent, or Firm* — Narendra Reddy Thappeta

(57) ABSTRACT

An aspect of the present invention simplifies provisioning of asynchronous interaction with enterprise suites having synchronous integration points. In one embodiment, a digital processing system receives, from a user, data indicating that asynchronous interaction is required for a synchronous integration point of an enterprise suite, and in response, auto-generates a set of service oriented architecture (SOA) artifacts designed to synchronously invoke the synchronous integration point and provide asynchronous interaction with external systems. The auto-generated SOA artifacts are then deployed in SOA server, whereby external systems can interact asynchronously to access a functionality provided by the synchronous integration point. According to another aspect, the system, also receives from the user, a second data indicating a set of policies to be applied, and in response, auto-generates the set of SOA artifacts to implement the set of policies during asynchronous interaction with external systems.

20 Claims, 11 Drawing Sheets

(56) References Cited

OTHER PUBLICATIONS

Weihua Huang, Xiaoping Li , "A SOA based Framework of Service Ability Description and Selection Methods for Application Integration in Manufacturing Domain", Publication year 2009, International Conference on Interoperability for Enterprise Software and Applications China, IEEE computer Society, pp. 20-211.

Ying Cao, Mier Zhang, "Integration of Enterprise Application Based on SOA", WCSE '09 Proceedings of the 2009 WRI World Congress on Software Engineering, Published May 2009, p. 227-231, ISBN: 978-0-7695-3570-8, vol. 3, IEEE Computer Society Washington, DC, USA.

* cited by examiner

```
<?xml version="1.0" encoding="UTF-8" standalone="no"?>
<composite xmlns="http://xmlns.oracle.com/sca/1.0"
   xmlns:xs="http://www.w3.org/2001/XMLSchema"
   ...
   xmlns:ui="http://xmlns.oracle.com/soa/designer/"
   name="OrderManagement" revision="1.0" label="2010-08-14_20-58-14_265"
   mode="active" state="on">
   <import namespace="http://xmlns.oracle.com/apps/oe/soaprovider/plsql/order_management/"
      location="ORDER_MANAGEMENT_soap.wsdl" importType="wsdl"/>
   <import namespace="http://xmlns.oracle.com/apps/oe/soaprovider/plsql/order_management/create_order/"
      location="CREATE_ORDER.wsdl" importType="wsdl"/>
   <import namespace="http://xmlns.oracle.com/ISG/ORDER_MANAGEMENT/CREATE_ORDER_ASYNCH"
      location="CREATE_ORDER_ASYNCH.wsdl" importType="wsdl"/>
510 → <service name="ORDER_MANAGEMENT_Service" ui:wsdlLocation="ORDER_MANAGEMENT_soap.wsdl">
      <interface.wsdl interface="http://xmlns.oracle.com/apps/oe/soaprovider/plsql/order_management/
            #wsdl.interface(ORDER_MANAGEMENT_PortType)"
         callbackInterface="http://xmlns.oracle.com/apps/oe/soaprovider/plsql/order_management/
            #wsdl.interface(ORDER_MANAGEMENT_CallBack_PortType)"/>
      <binding.ws port="http://xmlns.oracle.com/apps/oe/soaprovider/plsql/order_management/
            #wsdl.endpoint(ORDER_MANAGEMENT_Service/ORDER_MANAGEMENT_Port)"
            location="ORDER_MANAGEMENT_soap_http.wsdl">
520      <wsp:PolicyReference URI="oracle/wss_username_token_service_policy" orawsp:category="security" orawsp:status="enabled"/>
         <property name="weblogic.wsee.wsat.transaction.flowOption" type="xs:string" many="false">SUPPORTS</property>
         <property name="weblogic.wsee.wsat.transaction.version" type="xs:string" many="false">WSAT10</property>
      </binding.ws>
      <callback>
         <binding.ws port="http://xmlns.oracle.com/apps/oe/soaprovider/plsql/order_management/
            #wsdl.endpoint(ORDER_MANAGEMENT_Service/ORDER_MANAGEMENT_CallBack_PortType_pt)"/>
      </callback>
   </service>
```

*FIG. 5A*

```
<component name="Mediator">
    <implementation.mediator src="Mediator.mplan"/>
</component>
530 <component name="CREATE_ORDER_ASYNCH">
    <implementation.bpel src="CREATE_ORDER_ASYNCH.bpel"/>
</component>
540 <reference name="CREATE_ORDER" ui:wsdlLocation="CREATE_ORDER.wsdl">
    <interface.wsdl interface="http://xmlns.oracle.com/apps/oe/soaprovider/plsql/order_management/create_order/
            #wsdl.interface(CREATE_ORDER_ptt)"/>
    <binding.jca config="CREATE_ORDER_apps.jca"/>
    <property name="jca.retry.count" type="xs:int" many="false" override="may">4</property>
    <property name="jca.retry.interval" type="xs:int" many="false" override="may">1</property>
    <property name="jca.retry.backoff" type="xs:int" many="false" override="may">2</property>
    <property name="jca.retry.maxInterval" type="xs:string" many="false" override="may">120</property>
</reference>
560 <wire>
    <source.uri>Mediator/CREATE_ORDER</source.uri>
    <target.uri>CREATE_ORDER</target.uri>
</wire>
<wire>
    <source.uri>ORDER_MANAGEMENT_Service</source.uri>
    <target.uri>Mediator/Mediator</target.uri>
</wire>
<wire>
    <source.uri>CREATE_ORDER_ASYNCH/CREATE_ORDER</source.uri>
    <target.uri>CREATE_ORDER</target.uri>
</wire>
<wire>
    <source.uri>Mediator/CREATE_ORDER_ASYNCH.CREATE_ORDER_ASYNCH</source.uri>
    <target.uri>CREATE_ORDER_ASYNCH/CREATE_ORDER_ASYNCH</target.uri>
</wire>
</composite>
```

FIG. 5B

```
<adapter-config name="CREATE_ORDER" adapter="Oracle Applications Adapter"
 wsdlLocation="CREATE_ORDER.wsdl" xmlns:="http://platform.integration.oracle/blocks/adapter/fw/metadata">
  <connection-factory location="eis/Apps/isg122d" UIConnectionName="isg122d"
   UIOracleAppType="DBOBJECT" adapterRef=""/>
  <endpoint-interaction portType="CREATE_ORDER_ptt" operation="CREATE_ORDER">
    <interaction-spec className="oracle.tip.adapter.apps.AppsStoredProcedureInteractionSpec">
      <property name="IRepInternalName" value="PLSQL:ORDER_MANAGEMENT:CREATE_ORDER"/>
      <property name="SchemaName" value="APPS" />
610 → <property name="PackageName" value=" ORDER_MANAGEMENT" />
620 → <property name="ProcedureName" value=" CREATE_ORDER" />
      <property name="Username" value="sysadmin"/>
      <property name="Responsibility" value="System Administrator"/>
      <property name="DataSecurityCheck" value="yes"/>
      <property name="IRepOverloadSeq" value="1"/>
    </interaction-spec>
    <output/>
  </endpoint-interaction>
</adapter-config>
```

FIG. 6

```
710 → <process name="CREATE_ORDER_ASYNCH"
         targetNamespace="http://xmlns.oracle.com/isg/order_management/CREATE_ORDER_ASYNCH"
         ...
         xmlns:ns1="http://xmlns.oracle.com/apps/oe/soaprovider/plsql/order_management/create_order/">
  <partnerLinks>
    <partnerLink name="CREATE_ORDER_ASYNCH" partnerLinkType="client:CREATE_ORDER_ASYNCH"
      myRole="CREATE_ORDER_ASYNCHProvider" partnerRole="CREATE_ORDER_ASYNCHRequester"/>
720 [ <partnerLink name="CREATE_ORDER" partnerRole="CREATE_ORDER_role"
       partnerLinkType="ns1:CREATE_ORDER_plt"/>
  </partnerLinks>
  <variables>
    <variable name="inputVariable" messageType="client:CREATE_ORDER_ASYNCHRequestMessage"/>
    <variable name="outputVariable" messageType="client:CREATE_ORDER_ASYNCHResponseMessage"/>
    <variable name="Invoke_1_CREATE_ORDER_InputVariable" messageType="ns1:args_in_msg"/>
    <variable name="Invoke_1_CREATE_ORDER_OutputVariable" messageType="ns1:args_out_msg"/>
  </variables>
```

```
<sequence name="main">
   <receive name="receiveInput" partnerLink="CREATE_ORDER_ASYNCH" portType="client:CREATE_ORDER_ASYNCH"
      operation="process" variable="inputVariable" createInstance="yes"/>
   <assign name="Transform_1">
      <bpelx:annotation><bpelx:pattern>transformation</bpelx:pattern></bpelx:annotation>
      <copy>
         <from expression="ora:processXSLT('xsl/Transformation_CREATE_ORDER_1.xsl',
                                             bpws:getVariableData('inputVariable','payload'))"/>
         <to variable="Invoke_1_CREATE_ORDER_InputVariable" part="InputParameters"/>
      </copy>
   </assign>
   <invoke name="Invoke_1"
         inputVariable="Invoke_1_CREATE_ORDER_InputVariable"
         outputVariable="Invoke_1_CREATE_ORDER_OutputVariable"
         partnerLink="CREATE_ORDER" portType="ns1:CREATE_ORDER_ptt"
         operation="CREATE_ORDER"/>
   <assign name="Transform_2">
      <bpelx:annotation><bpelx:pattern>transformation</bpelx:pattern></bpelx:annotation>
      <copy>
         <from expression="ora:processXSLT('xsl/Transformation_CREATE_ORDER_2.xsl',bpws:
                     getVariableData('Invoke_1_CREATE_ORDER_OutputVariable','OutputParameters'))"/>
         <to variable="outputVariable" part="payload"/>
      </copy>
   </assign>
   <invoke name="callbackClient" partnerLink="CREATE_ORDER_ASYNCH"
      portType="client:CREATE_ORDER_ASYNCHCallback" operation="processResponse" inputVariable="outputVariable"/>
</sequence>
</process>
```

```
<?xml version="1.0" encoding="UTF-8" standalone="no"?>
<definitions xmlns="http://schemas.xmlsoap.org/wsdl/"
    xmlns:tns="http://xmlns.oracle.com/apps/oe/soaprovider/plsql/order_management/"
    ...
    xmlns:tnsa1="http://xmlns.oracle.com/isg/order_management/CREATE_ORDER_ASYNCH"
    name="ORDER_MANAGEMENT" targetNamespace="http://xmlns.oracle.com/apps/oe/soaprovider/plsql/order_management/">
<types>
    <schema xmlns="http://www.w3.org/2001/XMLSchema" elementFormDefault="qualified"
            targetNamespace="http://xmlns.oracle.com/apps/oe/soaprovider/plsql/order_management/create_order/">
810→    <include schemaLocation="xsd/APPS_ORDER_MANAGEMENT_CREATE_ORDER.xsd"/>
    </schema>
    ...
    <schema elementFormDefault="qualified" xmlns="http://www.w3.org/2001/XMLSchema"
            targetNamespace="http://xmlns.oracle.com/isg/order_management/CREATE_ORDER_ASYNCH">
820→    <include schemaLocation="xsd/CREATE_ORDER_ASYNCH.xsd"/>
    </schema>
</types>
830
<message name="CREATE_ORDER_Input_Msg">
    <part name="header" element="tns:SOAHeader"/>
    <part name="body" element="tns1:InputParameters"/>
</message>
<message name="CREATE_ORDER_Output_Msg">
    <part name="body" element="tns1:OutputParameters"/>
</message>
<message name="CREATE_ORDER_ASYNCH_Input_Msg">
    <part name="header" element="tns:SOAHeader"/>
    <part name="body" element="tnsa1:inputParameters"/>
</message>
<message name="CREATE_ORDER_ASYNCH_Output_Msg">
    <part name="body" element="tnsa1:outputParameters"/>
</message>
```

```
<portType name="ORDER_MANAGEMENT_PortType">
    <operation name="CREATE_ORDER">
        <input message="tns:CREATE_ORDER_Input_Msg"/>
        <output message="tns:CREATE_ORDER_Output_Msg"/>
    </operation>
    <operation name="CREATE_ORDER_ASYNCH">
        <input message="tns:CREATE_ORDER_ASYNCH_Input_Msg"/>
    </operation>
</portType>
...
<binding name="ORDER_MANAGEMENT_Binding" type="tns:ORDER_MANAGEMENT_PortType">
    <soap:binding style="document" transport="http://schemas.xmlsoap.org/soap/http"/>
    <operation name="CREATE_ORDER">
        <soap:operation soapAction="CREATE_ORDER"/>
        <input>
            <soap:header message="tns:CREATE_ORDER_Input_Msg" part="header" use="literal"/>
            <soap:body parts="body" use="literal"/>
        </input>
        <output><soap:body use="literal"/></output>
    </operation>
    <operation name="CREATE_ORDER_ASYNCH">
        <soap:operation soapAction="CREATE_ORDER_ASYNCH"/>
        <input>
            <soap:header message="tns:CREATE_ORDER_ASYNCH_Input_Msg" part="header" use="literal"/>
            <soap:body use="literal" parts="body"/>
        </input>
    </operation>
</binding>
...
<service name="ORDER_MANAGEMENT_Service">
    <port name="ORDER_MANAGEMENT_Port" binding="tns:ORDER_MANAGEMENT_Binding">
        <soap:address location="#NOT_DEPLOYED#"/>
    </port>
</service>
...
</definitions>
```

FIG. 8B

SIMPLIFYING PROVISIONING OF ASYNCHRONOUS INTERACTION WITH ENTERPRISE SUITES HAVING SYNCHRONOUS INTEGRATION POINTS

BACKGROUND OF THE INVENTION

1. Technical Field

The present disclosure relates to enterprise systems, and more specifically to simplifying provisioning of asynchronous interaction with enterprise suites having synchronous integration points.

2. Related Art

An enterprise suite refers to one or more applications that cohesively operate together to implement diverse functionalities required in an enterprise/organization. Each functionality represents a well-defined (in terms of required inputs and corresponding expected outputs, from a user perspective) high level function (e.g., create order and update invoice in inventory management, retrieve leads/contact and place voice call to a lead in customer relationship management, etc.) that is available to respective groups of users. Examples of such enterprise suites include Oracle E-Business Suite Release 12.1.1 available from Oracle Corporation, SAP Business Suite available from SAP AG, etc.

Integration points are often provided by enterprise suites to facilitate external systems (e.g., client systems, third party applications, etc.) to access the corresponding functionalities. Integration points are referred to as such, since they are exposed (made accessible for invocation from external systems) with pre-specified identifiers (e.g., procedure names). External systems can accordingly access the corresponding functionality by invoking the integration points as per a pre-specified convention (e.g., an Application Procedure Interface (API) invocation).

Integration points often provide synchronous interaction, implying that an external system is required to wait for the response after invoking (or sending a request to) the integration point. Waiting implies that the execution flow (in the external system) typically stops at the invocation point until the corresponding response is received from the integration point.

In contrast, when accessing integration points that provide asynchronous interaction, the external system does not wait for the response. Rather, the response is delivered to the external system at a later time point after completion of processing of the request by the enterprise suite. Thus the execution flow in the external system can continue even after invocation of the integration point, without having to wait for the response. Integration points are accordingly viewed as synchronous and/or asynchronous, depending on the interaction they provide.

There is often a need to provision asynchronous interaction with enterprise suites having synchronous integration points. Such a task entails providing additional layer(s) between the integration points and the external systems, with such provided layer(s) interacting synchronously with the integration points, and interacting asynchronously with the external systems. It is generally desirable to simplify the provisioning of such layer(s).

BRIEF DESCRIPTION OF THE DRAWINGS

Example embodiments of the present invention will be described with reference to the accompanying drawings briefly described below.

FIGS. 5A-5B together depicts portions of an XML file that specifies a SCA composite application providing synchronous and asynchronous interaction with a synchronous integration point (Create Order) in one embodiment.

FIG. 6 depicts a portion of an XML file specifying the detail of a JCA adaptor providing synchronous interaction with an integration point (Create Order) in one embodiment.

FIGS. 7A-7B depicts a portion of an XML file specifying the detail of a BPEL process providing asynchronous interaction with an integration point (Create Order) in one embodiment.

FIG. 8A-8B together depicts a portion of a WSDL file specifying the manner in which the SOA/web services corresponding to the synchronous and asynchronous invocation of an integration point (Create Order) is to be accessed in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention simplifies provisioning of asynchronous interaction with enterprise suites having synchronous integration points. In one embodiment, a digital processing system receives, from a user, data indicating that asynchronous interaction is required for a synchronous integration point of an enterprise suite. In response to the receiving of the data, the system auto-generates a set of service oriented architecture (SOA) artifacts designed to synchronously invoke the synchronous integration point and provide asynchronous interaction with external systems. The auto-generated SOA artifacts are then deployed in SOA server, whereby external systems can interact asynchronously to access a functionality provided by the synchronous integration point.

According to another aspect of the present invention, a list of synchronous integration points is displayed on a display unit, with the user enabled to indicate whether asynchronous interaction is required for any of the list of synchronous integration points. The SOA artifacts are auto-generated based on the indication received from the user.

According to one more aspect of the present invention, a second data, indicating a set of policies to be applied during asynchronous interaction, is received from a user. In response, a system auto-generates a set of SOA artifacts to implement the set of policies during asynchronous interaction with external systems. The set of policies may be one or more of addressing policy, atomic transaction policy, optimized message transmission policy, reliable messaging policy and security policy.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
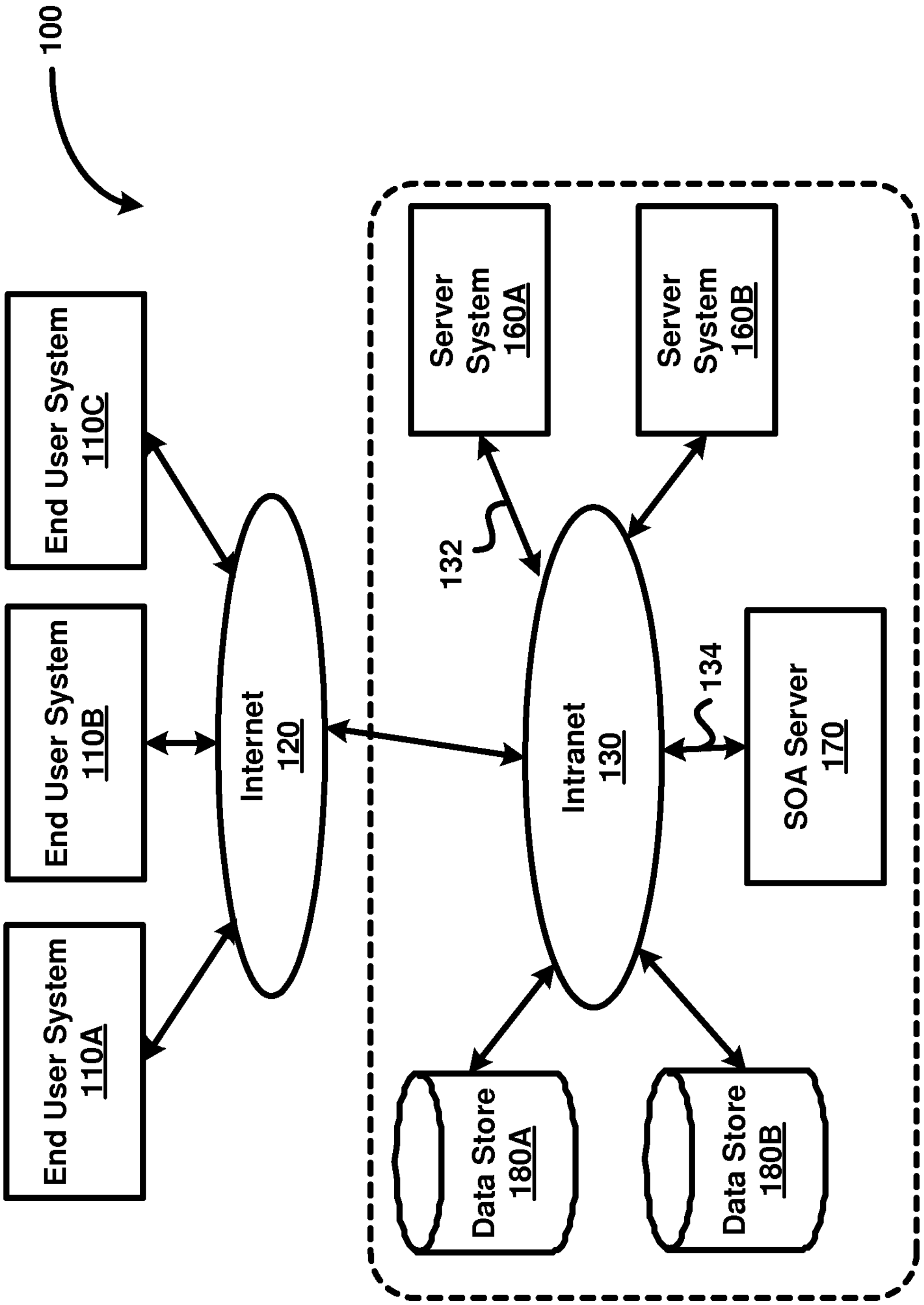
FIG. 1 is a block diagram illustrating an example environment (computing system 100) in which several aspects of the present invention can be implemented.

FIG. 1 is a block diagram illustrating an example environment (computing system 100) in which several aspects of the present invention can be implemented. The block diagram is shown containing end user systems 110A-110C, Internet 120, intranet 130, server systems 160A-160B, SOA server 170 and data stores 180A-180B.

Merely for illustration, only representative number/type of systems is shown in FIG. 1. Many environments often contain many more systems, both in number and type, depending on the purpose for which the environment is designed. Each system/device of FIG. 1 is described below in further detail.

Intranet 130 represents a network providing connectivity between server systems 160A-160B, SOA server 170 and data stores 180A-180B, all provided within an enterprise (as indicated by the dotted boundary). Internet 120 extends the connectivity of these (and other systems of the enterprise) with external systems such as end user systems 110A-110C. Each of intranet 130 and Internet 120 may be implemented using protocols such as Transmission Control Protocol (TCP) and/or Internet Protocol (IP), well known in the relevant arts.

In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 130. When the packet contains content such as port numbers, which specifies the target application, the packet may be said to be directed to such application as well.

SOA server 170 represents a server (referred to as "provider" system) capable of providing SOA services, which can be invoked by other (consumer) systems via a network (Internet 120 and/or intranet 130) using well defined protocols such as SOAP over Hypertext Transfer Protocol (HTTP). As is well known, SOA services are defined by corresponding contracts often specified according to Web Service Definition Language (WSDL), which specify the corresponding input/output parameters of the service, the type of the parameters, the format of invoking the service (sending the request), the format of the response, etc.

Examples of SOA servers are Oracle SOA Suite available from Oracle Corporation, IBM Websphere ESB Suite available from IBM Corporation, etc., which can be used to implement SOA services such as enterprise service bus (ESB) services which facilitate routing of requests/responses between consumer and provider systems, business process execution language (BPEL) services used to orchestrate (perform together) one or more services provided by the other provider systems, web services that perform respective tasks, etc.

Each of end user systems 110A-110C represents a system such as a personal computer, workstation, mobile station, etc., used by users to generate (user) requests directed to enterprise applications executing in server systems 160A-160B. The requests may be generated using appropriate user interfaces. In general, a client system requests an enterprise application for performing desired tasks and receives corresponding responses containing the results of performance of the requested tasks. Each request is sent in the form of an IP packet directed to the desired server system, with the IP packet including data identifying the desired tasks in the payload portion.

Each of data stores 180A-180B represents a non-volatile (persistent) storage facilitating storage and retrieval of a collection of data by enterprise applications executing in server systems 160A-160B. Each of data stores 180A-180B may be implemented as a database server using relational database technologies and accordingly provide storage and retrieval of data using structured queries such as SQL (Structured Query Language). Alternatively, each of data stores 180A-180B may be implemented as a file server providing storage and retrieval of data in the form of files organized as one or more directories, as is well known in the relevant arts.

Each of server systems 160A-160B represents a server, such as a web/application server, executing enterprise applications capable of performing tasks (e.g., processing requests) requested by users using one of end user systems 110A-110C. A server system may use data stored internally, external data maintained in data stores 180A-180B or that received from external sources (e.g., from the user) in performing such tasks. The server system then sends the result of performance of the tasks to the requesting end user system (one of 110A-110C).

It may be appreciated that the various enterprise applications executing in server systems 160A-160B may be part of an enterprise suite that operate together to implement diverse functionalities of the enterprise (shown as the dotted boundary). As noted in the Background section, such an enterprise suite often provides integration points to facilitate external systems (e.g. users using end user systems 110A-110C, third party applications executing in server systems 160A-160B) to access corresponding functionalities within the enterprise suite. In particular, some of the integration points may be of 'legacy' type (implying that the points are continued for reasons such as continuity) and characterized by implementations using technologies that may not support external access over a network (e.g., using web services).

The manner in which such integration points may be provided and accessed (by external systems) is described below with examples.

3. Providing Integration Points

Figure 2:
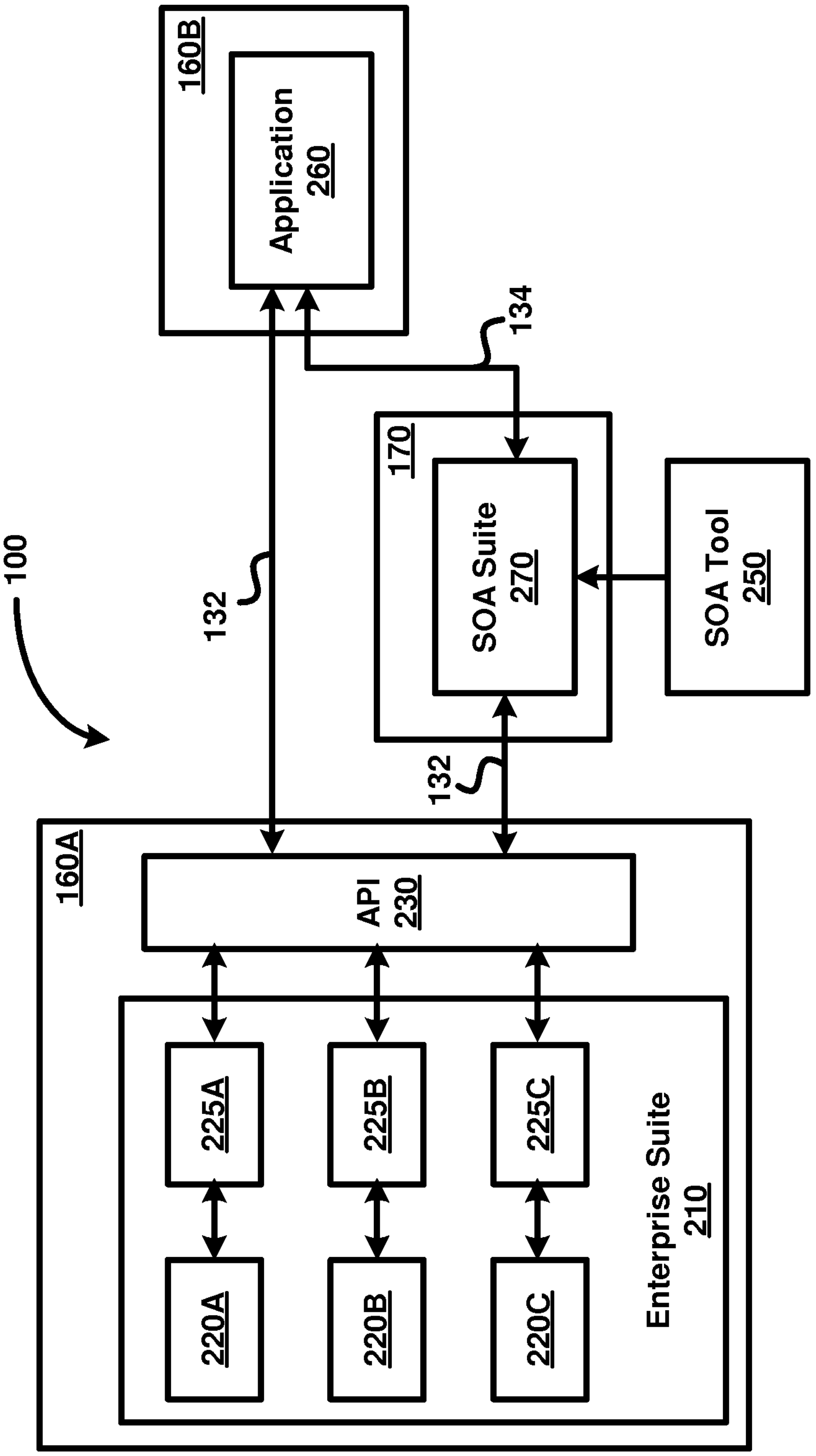
FIG. 2 is a block diagram depicting additional details of computing system 100 of FIG. 1, illustrating the manner in which integration points provided (by an enterprise suite) are accessed by external systems in one embodiment.

FIG. 2 is a block diagram depicting additional details of computing system 100 of FIG. 1, illustrating the manner in which integration points provided (by an enterprise suite) are accessed by external systems in one embodiment.

The block diagram is shown containing enterprise suite 210 and API 230 executing in server system 160A, (third party) application 260 executing in server system 160B, service oriented architecture (SOA) suite 270 executing in SOA server 170 and SOA tool 250. Enterprise suite 210 is further shown containing executable modules 220A-220C and integration points 225A-225B. Each of the blocks is described in detail below.

Enterprise suite 210 represents a set of one or more enterprise applications that operate together to implement various functionalities of the enterprise. Enterprise suite 210 is shown as being executed in server system 160A merely for convenience. In alternative embodiments, the different applications forming part of the enterprise suite may be executing in multiple server systems in the enterprise, as will be apparent to one skilled in the relevant arts.

Enterprise suite 210 is shown providing integration points 225A-225C, using which external systems are facilitated to access the corresponding functionalities (implemented within and) provided by enterprise suite 210. Each integration point is shown exposing a corresponding executable module 220A-220C implementing a corresponding functionality within enterprise suite 210.

For example, each of executable modules 220A-220C may be one of database resident programs such as PL/SQL stored procedures, concurrent programs, XML (eXtensible Markup Language) Gateway Maps, Java classes such as Business Service Objects, Java API for Forms, DLL (Dynamic Link Library) files, etc. It should be noted that integration points 225A-225C are synchronous integration points, in that the integration points provide only for synchronous interaction with external systems.

Application 260 (assumed to be executing in server system 160B, though can alternatively be executed in end user system 110A-110C) represents a third party application which needs to access some of the functionalities provided by enterprise suite 210. Application 260 may accordingly interact with any of integration points 225A-225C, based on the functionality (corresponding execution module 220A-220C) sought to be accessed. The interaction may be performed either by invoking API 230 or by sending requests for services provided by SOA suite 270, as described below with examples.

4. Accessing Integration Points

API (application programming interface) 230 facilitates synchronous interaction between external systems such as application 260 and the various integration points (such as 225A-225C) provided by enterprise suite 210. Though shown external to enterprise suite 210, it may be appreciated that in alternative embodiments, API 230 may be implemented as an integral part of enterprise suite 210.

API 230 commonly exposes each of integration points (225A-225C) as a corresponding a procedure having a procedure name and set of parameters. Application 260 may accordingly be designed to invoke (using standard protocols such as remote procedure calls (RPC), remote method invocation (RMI), well known in the arts) the procedure corresponding to the integration point sought to be accessed. In response to invocation of a specific procedure, API 230 invokes/sends a request to the corresponding integration point (causing the executing of the corresponding execution module), waits for and receives a corresponding result/response and then sends the result/response to application 260.

It should be noted that such synchronous interaction with API 230 may necessitate application 260 to be implemented according to a specific set of programming languages (typically, associated with the programming language in which API 230 is implemented). Examples of such programming language include Java language (available from Oracle Corporation), C#/VB.Net, languages available from Microsoft, and C/C++ languages. There may be several scenarios in which such a limitation may not be desirable.

SOA suite 270 overcomes such a limitation by exposing the integration points (225A-225C) of enterprise suite 210 as corresponding SOA services. Application 260 may accordingly be designed to send requests for the SOA services corresponding to the desired integration points sought to be accessed. Application 260 sends the requests for the SOA services (and receives corresponding responses) according to standard protocols (SOAP over HTTP) noted above. Application 260 may according be implemented independent (for example, using any programming language) of the programming language/environment in which SOA suite 270 and/or API 230 is implemented.

In general, SOA services are implemented in the form of artifacts (in the provider systems such as SOA server 170). Each SOA artifact typically contains program logic implementing one or more of such services. A service is typically made available at a corresponding Uniform Resource Locator (URL), and the requests (sent by consumer systems) contain additional data to indicate the specific operation in case more than one operation is implemented by the service, as is well known in the relevant arts.

SOA suite 270 may accordingly contain multiple SOA artifacts, with the corresponding services being made available at different URLs. In one embodiment, the SOA artifacts are designed to invoke the corresponding procedures in API 230 in response to invocation of the corresponding SOA service. However, in alternative embodiments, the SOA artifacts may directly invoke the corresponding integration points, without going through API 230.

It may be appreciated that SOA suite 270 may be designed to provide both synchronous and asynchronous interaction with the integration points supporting only synchronous interaction (such as 225A-225C). In other words, SOA suite 270 is designed to interact synchronously with the integration points (225A-225C), and interact asynchronously with the external systems (application 260).

There are several challenges to provisioning of such (SOA based) synchronous/asynchronous interaction to integration points of an enterprise suite. For example, in a prior approach used for J2EE Connector Architecture (JCA) based products such as E-Business Suite Adapter available from Oracle Corporation and IBM Oracle Applications Adapter available from IBM Corporation, the SOA artifacts (forming SOA suite 270) required for synchronous and asynchronous interaction are created/developed manually by one or more developers.

Such manual development of the SOA artifacts may entail substantial effort (in terms of time and resources), and may thus be undesirable, particularly when there are a large number of integration points. Furthermore, some of the JCA products noted above facilitate only a limited type of execution modules (for example, database resident programs) to be exposed as corresponding integration points.

Another prior approach used in Integrated SOA Gateway (ISG) available as part of Oracle E-Business Suite product noted above, facilitates the generation (based on execution of executable modules) of some of the SOA artifacts, in particular the artifacts providing synchronous interaction with the integration points. However, such an approach does not generate the artifacts required for asynchronous interaction, and also does not take into consideration the various SOA/web services policies/standards such as WS-Atomic Transaction, WS-Reliable Messaging etc. to be enforced during the interaction.

SOA tool 250, provided according to several aspects of present invention, simplifies the provisioning of asynchronous interaction with enterprise suites having synchronous integration points, while overcoming some of the challenges noted above. SOA tool 250 may be implemented in any digital processing system (including server systems 160A/160B or SOA server 170). The operation and implementation of SOA tool 250 is described below with several examples for illustration.

5. Simplifying Provisioning of Asynchronous Interaction

Figure 3:
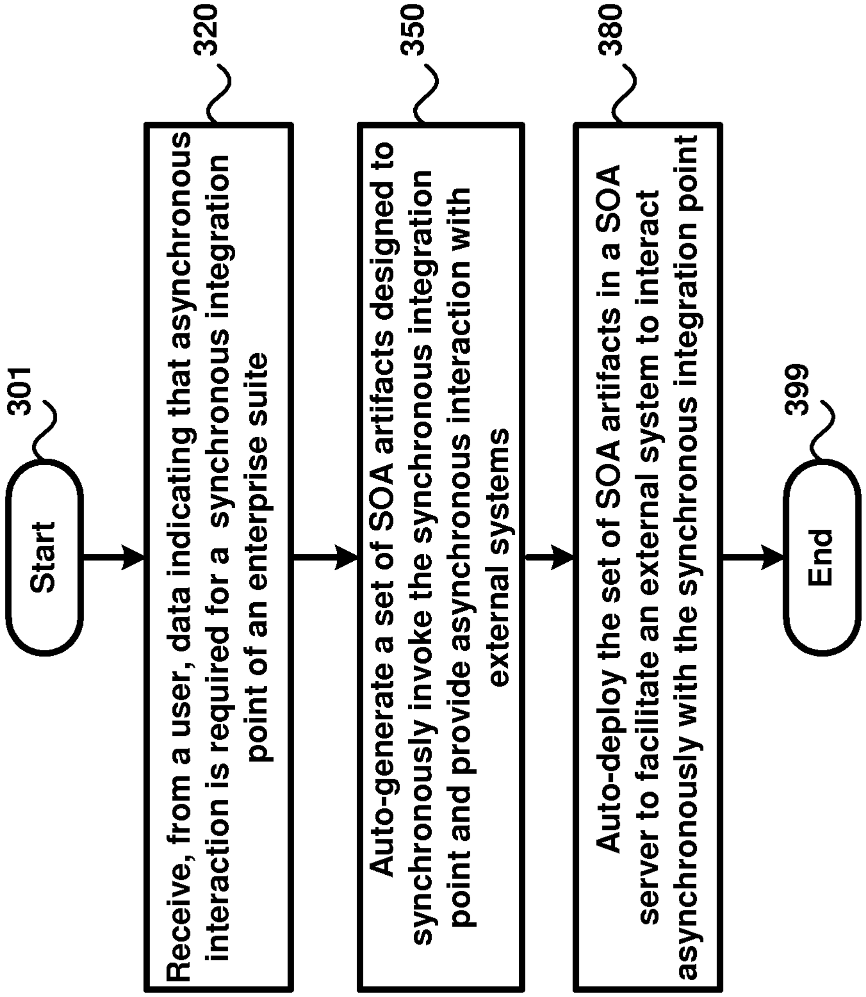
FIG. 3 is a flow chart illustrating the manner in which provisioning of asynchronous interaction with enterprise suites having synchronous integration points is simplified according to an aspect of the present invention.

FIG. 3 is a flow chart illustrating the manner in which provisioning of asynchronous interaction with enterprise suites having synchronous integration points is simplified according to an aspect of the present invention. The flowchart is described with respect to FIGS. 1 and 2 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 320.

In step 320, SOA tool 250 receives, from a user, data indicating that asynchronous interaction is required for a synchronous integration point of an enterprise suite. The data may be received interactively (as described in sections below) or in the form of configured data files, as will be apparent to a skilled practitioner, based on the disclosure provided herein. For example, the data may indicate that asynchronous interaction is required for integration point 225A of enterprise suite 210.

In step 350, SOA tool 250 auto-generates a set of SOA artifacts (contained in SOA suite 270) designed to synchronously invoke the synchronous integration point (225A) and provide asynchronous interaction with external systems (such as application 260). Auto-generation implies that the SOA artifacts are created by execution of executable modules without requiring any user inputs during and for the creation (after and in response to, receiving of the data in step 320) of the SOA artifacts.

In step 380, SOA tool 250 deploys the set of SOA artifacts in a SOA server (for example, 170) to facilitate an external system (application 260) to interact asynchronously with the synchronous integration point (225A). Deployment may entail performing various configurations by execution of various commands, creation and storage of specific artifacts in pre-specified locations, etc. The flow chart ends in step 399.

Thus, by auto-generation and deployment of the required SOA artifacts in response to the data received from a user, the provisioning of asynchronous interaction with enterprise suites having synchronous interaction points is simplified. In addition, it may be appreciated that the provisioning of synchronous interaction using SOA artifacts (in order to have better error response to the consumer/external system when problems occur during execution of the integration points) may also be simplified.

The manner in which a user may be enabled to indicate the specific synchronous interaction point and the corresponding SOA artifacts may be generated is described below with examples.

6. Example User Interface

Figure 4:
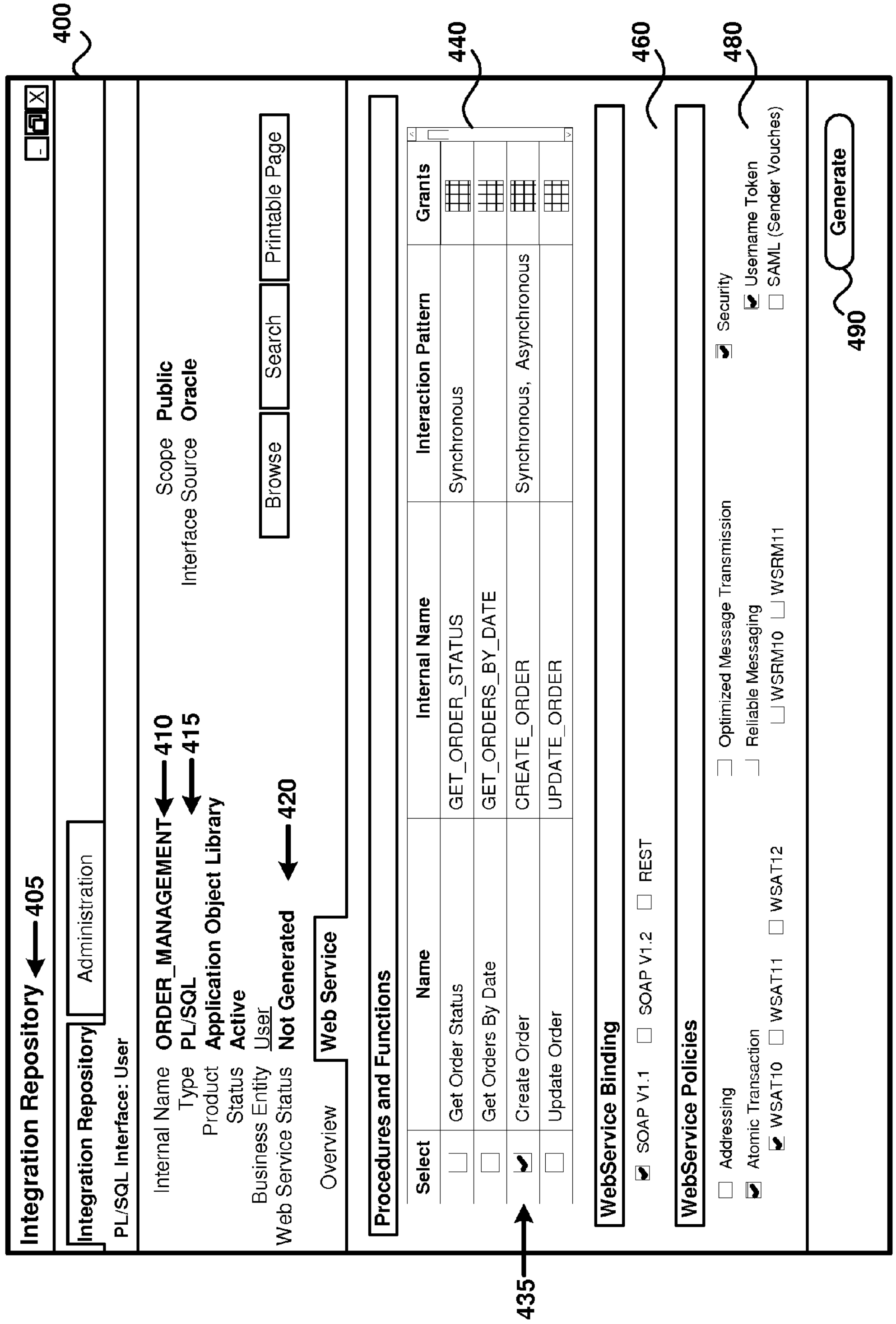
FIG. 4 illustrates the manner in which a user indicates the synchronous interaction points for which asynchronous interaction is to be provided in one embodiment.

FIG. 4 illustrates the manner in which a user indicates the synchronous interaction points for which asynchronous interaction is to be provided in one embodiment. Display area 400 represents a portion of a user interface displayed on a display unit (not shown) associated with server systems 160A (or any other system) executing enterprise suite 210. Display area 400 may be provided by SOA tool 250, in response to a request from a user/administrator of enterprise suite 210.

Display area 400 facilitates the user/administrator to view the various integration points provided by enterprise suite 210 (collectively referred to as "Integration Repository" as indicated by text 405). Text 410 indicates the name "ORDER_MANAGEMENT" of the package/execution module (sought to be exposed), while text 415 indicate the type "PL/SQL" of the package/execution module. Thus, the execution module is a database resident program that is sought to be exposed as integration points to external systems (such as application 260).

Text 420 indicates the status of whether SOA/web services have been generated for this execution module and/or the integration points. The text "Not Generated" indicates that web services for accessing the execution module have not yet been generated.

Display area 440 displays in a tabular form, a list of procedures/functions contained in the package "ORDER_MANAGEMENT". Column "Select" facilitates a user to select the desired procedures to be exposed as corresponding integration points (by selecting the corresponding checkbox shown in the column). Columns "Name" and "Internal Name" respectively indicates the description and the corresponding internal name (also the procedure name using which the procedure is invoked) of each of the procedures.

Column "Interaction Pattern" facilitates the user to indicate whether synchronous and/or asynchronous interactions are required for the corresponding procedure. The desired interaction pattern may be selected/deselected from a pop-up/context menu displayed (not shown) when the user selects the desired cell. Row 435 indicates that the user has indicated that synchronous and asynchronous interaction is required for the selected procedure "Create Order" having internal name "CREATE_ORDER".

Display area 460 facilitates the user to specify (by selecting the corresponding checkboxes) the desired protocols such as SOAP version 1.1, SOAP version 1.2, REST to be supported for the requests/responses between the external systems and the SOA services generated for accessing the selected integration points. Display area 460 indicates that the user has selected the SOAP version 1.1 protocols.

Display area 480 facilitates the user to specify (by selecting the corresponding checkboxes) the desired policies/standards to be enforced during the synchronous/asynchronous interactions. In particular, the user may specify whether addressing policy is to be enforced, whether atomic transactions policy is to be enforced and the specific standard (WSAT10, WSAT11, WSAT12) to be used if the policy is enforced, whether optimized message transmission is to be enforced, whether reliable messaging policy is to be enforced and the specific standard (WSRM10, WSRM11) to be used, whether security policy is to be enforced and the specific type of security (such as "Username Token", "SAML (Sender Vouches)", etc.) to be enforced.

Display area 480 indicates (based on the selected checkboxes) that the user has selected to enforce the atomic transaction policy according to WSAT10 standard and also the security policy using Username Tokens. It may be appreciated that the user may similarly select any desired combination of policies to be enforced using display area 480.

After selecting the integration points, the corresponding interaction patterns (synchronous and/or asynchronous), the protocols to be supported and the specific policies to be enforced during the interactions, the user may select/click on "Generate" button 490, to initiate the generation of the SOA artifacts required for implementing the user selection.

Thus, in response to the user selecting button 490, a data indicating the integration points, the corresponding interaction patterns, the protocols and policies is sent to SOA tool 250. SOA tool 250, in response to receiving the above data, auto-generates and deploys the SOA artifacts required for providing asynchronous interaction, as described below with examples.

7. Generating SOA Artifacts

In one embodiment, the SOA artifacts are generated in the form of a composite application according to Service Component Architecture (SCA), a set of specifications which describe a model for building applications and systems using a Service-Oriented Architecture. More details on SCA are available at "http://osoa.org/display/Main/Service+Component+Architecture+Home". The composites (individual services) are packaged as SCA composites as per the standard SCA assembly model. The resulting SCA composites can be deployed in any application server/middleware which supports SCA model (for example, Oracle SOA Suite noted above).

It should be appreciated that SOA tool 250 generates all the SOA artifacts required to construct a SOA composite application e.g. XML Schemas, WSDLs, BPEL artifacts, service references, etc. required for the user selected integration points and the corresponding interaction patters. The exact artifacts would depend on a number of factors such as type (database program or Java class) of interaction point, interaction pattern (synchronous, asynchronous or both), as will be apparent to one skilled in the relevant arts.

In one embodiment described below, JCA (J2EE Connector Architecture) based artifacts are generated for providing synchronous interaction, while BPEL (Business Process Execution Language) based artifacts are generated for providing asynchronous interaction. For conciseness, only a few of the SOA artifacts generated by SOA tool 250 (in response to receiving the data corresponding to the selection of display area 400) is described in detail below.

Each of FIGS. 5A-5B, 6, 7A-7B and 8A-8B depict sample SOA artifacts auto-generated (by SOA tool 250) for an interaction point in one embodiment. In particular, the sample SOA artifacts correspond to those auto-generated for providing synchronous and asynchronous interaction with the integration point "Create Order" (as indicated by row 435), the interaction supporting SOAP version 1.1 and enforcing atomic transaction and security policies (as respectively indicated in display areas 460 and 480). Each of the figures is described in detail below.

FIGS. 5A-5B together depicts portions of an XML file that specifies a SCA composite application providing synchronous and asynchronous interaction with a synchronous integration point (Create Order) in one embodiment. Data portion 510 indicates the name of the service as "ORDER_MANAGEMENT_Service" and the manner in which the service is to be accessed is specified in "ORDER_MANAGEMENT_soap.wsdl" (described in detail below with respect to FIGS. 8A-8B).

Data portion 520 specifies the various policies to be enforced during any interaction with the SCA composite application. It may be observed that the policies include Username Token Security policy and transaction policy according to WSAT10 standard, as specified by the user in display area 480 of FIG. 4.

Data portion 530 indicates that a BPEL artifact specified in the file "CREATE_ORDER_ASYNCH.bpel" is to be included in the composite application. Data portion 540 indicates that the JCA artifact specified in the file "CREATE_ORDER_apps.jca" is also to be included in the composite application. Data portion 560 specifies the relation between the inputs (source URI) and the components specified in the composite application. In particular, data portion 560 indicates that the JCA adaptor is to be invoked when the source URI includes the text "CREATE_ORDER" and the BPEL process is to be invoked when the source URI includes the text "CREATE_ORDER_ASYNCH". The components referred to in the composite application are described in detail below.

FIG. 6 depicts a portion of an XML file (in particular, "CREATE_ORDER_apps.jca" file) specifying the detail of a JCA adaptor providing synchronous interaction with an integration point (Create Order) in one embodiment. Data portion 610 indicates the name "ORDER_MANAGEMENT" of the package/execution module and data portion 620 indicates the internal name "CREATE_ORDER" of the procedure that is to be invoked, when a request for synchronous interaction is received by the composite application.

FIGS. 7A-7B depicts a portion of an XML file (in particular, "CREATE_ORDER_ASYNCH.bpel" file) specifying the detail of a BPEL process providing asynchronous interaction with an integration point (Create Order) in one embodiment. Data portion 710 indicates the name "CREATE_ORDER_ASYNCH" of the BPEL process, while data portion 720 indicates that the JCA adaptor is a partner link (to be used later during the processing of the request).

Data portion 730 specifies the sequence of actions to be performed in response to a request to the BPEL process. In particular, it may be observed that in data portion 740, the partner link (JCA adaptor) defined in data portion 720 is invoked. It may be observed that data portion 760 indicates that a call back service is invoked to return the results of invocation of the "CREATE_ORDER" integration point. Thus, an external system such as application 260 specifies the detail of the call back service and receives the results at a later time instance (after invocation), thereby accessing the integration point in an asynchronous manner.

FIG. 8A-8B together depicts a portion of a WSDL file (in particular "ORDER_MANAGEMENT_soap.wsdl" file) specifying the manner in which the SOA/web services corresponding to the synchronous and asynchronous invocation of an integration point (Create Order) is to be accessed in one embodiment.

Data portions 810 and 820 indicate that the respective XML Schema Definition (XSD) files containing the schema specifying the various data types and structures to be used in synchronous and asynchronous interactions are to be included as part of the WSDL file. It should be noted that these XSD files are also generated by SOA tool 250, based on the type of the procedures/functions and corresponding parameters exposed as integration points by the enterprise suite.

Data potion 830 specifies various message formats, while data portion 840 specifies the corresponding input/output parameters of the service in terms of the message formats defined in data portion 830. Data portion 860 specifies the format of invoking the service (sending the request), the format of the response, etc. In particular, data portion 860 indicates the two operations "CREATE_ORDER" and "CREATE_ORDER_ASYNCH" that can be invoked/accessed by external systems. Data portion 880 indicates the specifies the URL and port at which the above operations can be accessed.

Once the necessary artifacts are generated, SOA tool 250 assembles the generated artifacts according to SCA assembly model to create a deployable SCA JAR file (SOA Suite 270). It should be appreciated that no user intervention is required during the auto-generation process. The auto-generation process remains completely transparent to the user/administrator.

The user/administrator can then choose to deploy the composite application into any desired SOA server, directly using the "Administration" tab of the user interface shown in FIG. 4. In response to the user specifying a SOA server, SOA tool 250 deploys the SOA artifacts (forming the SCA composite application) into the selected SOA server (such as 170). Thus, SOA tool 250 generates and deploys the SOA artifacts required for provisioning of asynchronous interaction with enterprise suites having synchronous integration points.

After deployment of the SOA artifacts, application 260 can send a request for the SOA service to SOA server 170 indicating the specific operation "CREATE_ORDER" or "CREATE_ORDER_ASYNCH" to be performed. In response to the request, SOA server 170 executes the respective JCA/BPEL artifact, which in turn invokes the synchronous integration point "CREATE_ORDER" of the enterprise suite and receives the result of performance of the corresponding functionality (creation of an order). SOA server 170 enforces any policies specified during the interaction.

SOA server 170 may then send the result of invocation to application 260, in the scenario that the synchronous operation "CREATE_ORDER" was specified in the request. It should be appreciated that the request also specifies a call back service when the operation "CREATE_ORDER_ASYNCH" to be performed. SOA server 170 according invokes the call back service to return the results of invocation of the "CREATE_ORDER" integration point. Thus, application 260 is facilitated to interact asynchronously with synchronous integration points (225A-225C) of enterprise suite 210.

It may be appreciated that SOA tool 250 may be implemented as a part of enterprise management tools such as Oracle Enterprise Manager available from Oracle Corporation. Such modified management tools may then be utilized to manage the lifecycle of integration points, auto-generation and deployment of SOA services for the integration points, etc.

It should be further appreciated that the features described above can be implemented in various embodiments as a desired combination of one or more of hardware, executable modules, and firmware. The description is continued with respect to an embodiment in which various features are operative when the software instructions described above are executed.

8. Digital Processing System

Figure 9:
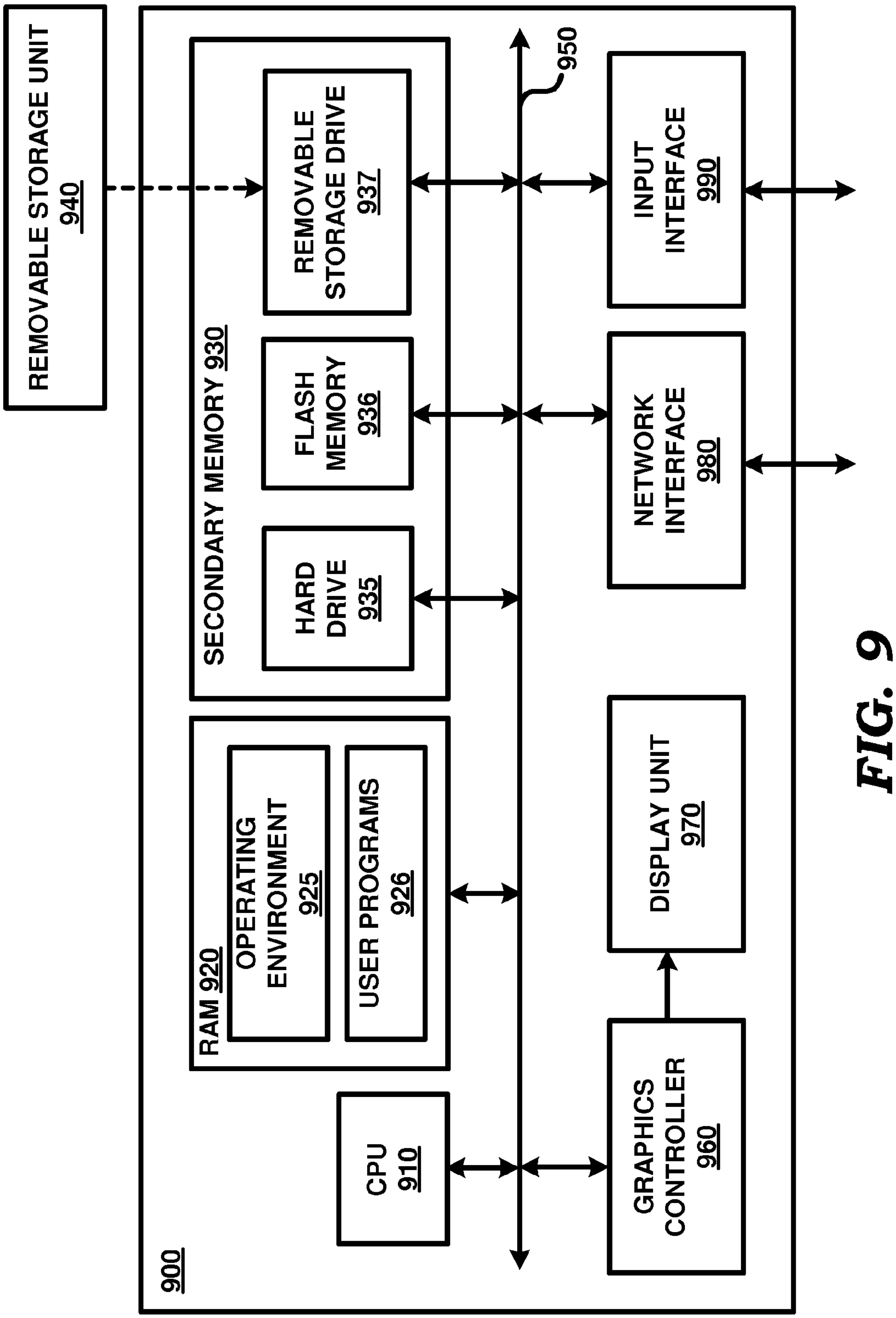
FIG. 9 is a block diagram illustrating the details of digital processing system 900 in which various aspects of the present invention are operative by execution of appropriate executable modules.

FIG. 9 is a block diagram illustrating the details of digital processing system 900 in which various aspects of the present invention are operative by execution of appropriate executable modules. Digital processing system 900 may correspond to any system (such as server system 160A) executing SOA tool 250.

Digital processing system 900 may contain one or more processors (such as a central processing unit (CPU) 910), random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or user programs 926 (such as networking applications, database applications, etc.). Shared environment 925 contains utilities shared by user programs, and such shared utilities include operating system, device drivers, virtual machines, flow engine, etc., which provide a (common) run time environment for execution of user programs/applications.

Graphics controller 960 generates display signals (e.g., in RGB format) to display unit 970 based on data/instructions received from CPU 910. Display unit 970 contains a display screen to display the images defined by the display signals (such as the user interface shown in FIGS. 3A-3C and 4A-4B). Input interface 990 may correspond to a keyboard and a pointing device (e.g., touch-pad, mouse) and may be used to provide the user inputs required for several aspects of the present invention (such as those provided for interacting with the user interfaces shown in FIGS. 3A-3C and 4A-4B). Network interface 980 provides connectivity to a network (e.g., using Internet Protocol), and may be used to communicate with other connected systems (such as client systems 110A-110C, data store 180, etc.) of FIG. 1.

Secondary memory 930 (representing a non-transitory storage/medium) may contain hard drive 935, flash memory 936, and removable storage drive 937. Secondary memory 930 may store the data (for example, data indicating the custom filters created by each user) and software instructions (for example, for performing the steps of FIG. 2), which enable digital processing system 900 to provide several features in accordance with the present invention.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of provisioning asynchronous interaction with enterprise suites having synchronous integration points, said method being implemented in a digital processing system, said method comprising:

receiving, from a user, data indicating that asynchronous interaction is required for a first synchronous integration point of an enterprise suite;

auto-generating, in response to said receiving, a first set of service oriented architecture (SOA) artifacts designed to synchronously invoke said first synchronous integration point and provide asynchronous interaction with external systems, wherein upon deployment of said first set of SOA artifacts in a SOA server, an external system can interact asynchronously to access a functionality provided by said first synchronous integration point.

2. The method of claim 1, further comprising:

displaying a list of synchronous integration points, including said first integration point, on a display unit; and enabling said user to indicate whether asynchronous interaction is required for any of said list of synchronous integration points, wherein said data is received upon said user indicating that asynchronous interaction is required for said first integration point.

3. The method of claim 2, further comprising:

receiving, from said user, a second data indicating a set of policies to be applied, during asynchronous interaction, wherein said first set of SOA artifacts are auto-generated to implement said set of policies during asynchronous interaction with said external system.

4. The method of claim 3, wherein said set of policies comprises at least one of addressing policy, atomic transaction policy, optimized message transmission policy, reliable messaging policy and security policy.

5. The method of claim 2, further comprising:

deploying, after said auto-generating and in response to said receiving, said first set of SOA artifacts in said SOA server.

6. The method of claim 5, wherein said enabling enables said user to also indicate whether synchronous interaction is required for any of said list of synchronous integration points, said method further comprising:

receiving, from said user, a third data indicating that both synchronous interaction and asynchronous interaction is required for a second synchronous integration point of an enterprise suite;

auto-generating, in response to said receiving of said third data, a second set of service oriented architecture (SOA) artifacts and a third set of SOA artifacts, wherein said second set of SOA artifacts are designed to synchronously invoke said second synchronous integration point and provide asynchronous interaction with external systems, wherein said third set of SOA artifacts are designed to synchronously invoke said second synchronous integration point and provide synchronous interaction with external systems, wherein said deploying deploys said second set of SOA artifacts and said third set of SOA artifacts in said SOA server, wherein external systems can interact synchronous and asynchronously to access a functionality provided by said second synchronous integration point.

7. The method of claim 6, wherein said second set of SOA artifacts and said third set of SOA artifacts are deployed as part of a Service Component Architecture (SCA) composite application.

8. The method of claim 7, wherein said second set of SOA artifacts comprises Business Process Execution Language (BPEL) artifacts and said third set of SOA artifacts comprises J2EE Connector Architecture (JCA) artifacts.

9. A non-transitory machine readable medium storing one or more sequences of instructions for causing a system to provision asynchronous interaction with enterprise suites having synchronous integration points, wherein execution of said one or more sequences of instructions by one or more processors contained in said system causes said system to perform the actions of:

receiving, from a user, data indicating that asynchronous interaction is required for a first synchronous integration point of an enterprise suite;

auto-generating, in response to said receiving, a first set of service oriented architecture (SOA) artifacts designed to synchronously invoke said first synchronous integration point and provide asynchronous interaction with external systems, wherein upon deployment of said first set of SOA artifacts in a SOA server, an external system can interact asynchronously to access a functionality provided by said first synchronous integration point.

10. The machine readable medium of claim 9, further comprising one or more instructions for:

displaying a list of synchronous integration points, including said first integration point, on a display unit; and enabling said user to indicate whether asynchronous interaction is required for any of said list of synchronous integration points, wherein said data is received upon said user indicating that asynchronous interaction is required for said first integration point.

11. The machine readable medium of claim 10, further comprising one or more instructions for:

receiving, from said user, a second data indicating a set of policies to be applied, during asynchronous interaction, wherein said first set of SOA artifacts are auto-generated to implement said set of policies during asynchronous interaction with said external system.

12. The machine readable medium of claim 11, wherein said set of policies comprises at least one of addressing policy, atomic transaction policy, optimized message transmission policy, reliable messaging policy and security policy.

13. The machine readable medium of claim 10, further comprising one or more instructions for:

deploying, after said auto-generating and in response to said receiving, said first set of SOA artifacts in said SOA server.

14. The machine readable medium of claim 13, wherein said enabling enables said user to also indicate whether synchronous interaction is required for any of said list of synchronous integration points, further comprising one or more instructions for:

receiving, from said user, a third data indicating that both synchronous interaction and asynchronous interaction is required for a second synchronous integration point of an enterprise suite;

auto-generating, in response to said receiving of said third data, a second set of service oriented architecture (SOA) artifacts and a third set of SOA artifacts, wherein said second set of SOA artifacts are designed to synchronously invoke said second synchronous integration point and provide asynchronous interaction with external systems, wherein said third set of SOA artifacts are designed to synchronously invoke said second synchronous integration point and provide synchronous interaction with external systems, wherein said deploying deploys said second set of SOA artifacts and said third set of SOA artifacts in said SOA server, wherein external systems can interact synchronous and asynchronously to access a functionality provided by said second synchronous integration point.

15. The machine readable medium of claim 14, wherein said second set of SOA artifacts and said third set of SOA artifacts are deployed as part of a Service Component Architecture (SCA) composite application.

16. The machine readable medium of claim 15, wherein said second set of SOA artifacts comprises Business Process Execution Language (BPEL) artifacts and said third set of SOA artifacts comprises J2EE Connector Architecture (JCA) artifacts.

17. A digital processing system comprising:

a processor;

a random access memory (RAM);

a non-transitory machine readable medium to store one or more instructions, which when retrieved into said RAM and executed by said processor causes said digital processing system to perform the actions of:

receiving, from a user, data indicating that asynchronous interaction is required for a first synchronous integration point of an enterprise suite;

auto-generating, in response to said receiving, a first set of service oriented architecture (SOA) artifacts designed to synchronously invoke said first synchronous integration point and provide asynchronous interaction with external systems, wherein upon deployment of said first set of SOA artifacts in a SOA server, an external system can interact asynchronously to access a functionality provided by said first synchronous integration point.

18. The digital processing system of claim 17, wherein said actions further comprise:

displaying a list of synchronous integration points, including said first integration point, on a display unit; and enabling said user to indicate whether asynchronous interaction is required for any of said list of synchronous integration points, wherein said data is received upon said user indicating that asynchronous interaction is required for said first integration point.

19. The digital processing system of claim 18, wherein said actions further comprise:

receiving, from said user, a second data indicating a set of policies to be applied, during asynchronous interaction, wherein said first set of SOA artifacts are auto-generated to implement said set of policies during asynchronous interaction with said external system.

20. The digital processing system of claim 18, wherein said enabling enables said user to also indicate whether synchronous interaction is required for any of said list of synchronous integration points, wherein said actions further comprise:

receiving, from said user, a third data indicating that both synchronous interaction and asynchronous interaction is required for a second synchronous integration point of an enterprise suite;

auto-generating, in response to said receiving of said third data, a second set of service oriented architecture (SOA) artifacts and a third set of SOA artifacts, wherein said second set of SOA artifacts are designed to synchronously invoke said second synchronous integration point and provide asynchronous interaction with external systems, wherein said third set of SOA artifacts are designed to synchronously invoke said second synchronous integration point and provide synchronous interaction with external systems, wherein said deploying deploys said second set of SOA artifacts and said third set of SOA artifacts in said SOA server, wherein external systems can interact synchronous and asynchronously to access a functionality provided by said second synchronous integration point.

* * * * *